(12) United States Patent
Margulis et al.

(10) Patent No.: US 7,643,716 B2
(45) Date of Patent: Jan. 5, 2010

(54) METHOD FOR CHANGING REFRACTIVE INDEX OF AN OPTICAL FIBER BY APPLYING A HIGH VOLTAGE PULSE TO A LONGITUDINAL ELECTRODE

(75) Inventors: Walter Margulis, Huddinge (SE); Harald Knape, Stockholm (SE)

(73) Assignee: Acreo AB, Kista (SE)

( * ) Notice: Subject to any disclaimer, the term of this patent is extended or adjusted under 35 U.S.C. 154(b) by 0 days.

(21) Appl. No.: 12/226,870

(22) PCT Filed: May 8, 2007

(86) PCT No.: PCT/SE2007/000449

§ 371 (c)(1),
(2), (4) Date: Jan. 5, 2009

(87) PCT Pub. No.: WO2007/129964

PCT Pub. Date: Nov. 15, 2007

(65) Prior Publication Data

US 2009/0169161 A1  Jul. 2, 2009

(30) Foreign Application Priority Data

May 10, 2006  (SE) .................................. 0601034

(51) Int. Cl.
*G02B 6/02* (2006.01)
(52) U.S. Cl. .......................... 385/123; 385/37; 385/40; 372/6
(58) Field of Classification Search .............. 385/8–10, 385/37, 40, 123–128; 372/6
See application file for complete search history.

(56) References Cited

U.S. PATENT DOCUMENTS 6,041,149 A     3/2000  Monte
6,192,177 B1 *  2/2001  Amundson et al. ............ 385/37

(Continued)

FOREIGN PATENT DOCUMENTS

WO    WO 2006/025792    3/2006

OTHER PUBLICATIONS

Tarasenko, O. et al.: "All-fiber electrooptical polarization control", Optical Fiber Communication Conference, 2006 and the 2006 National Fiber Engineers Conference.

(Continued)

*Primary Examiner*—Daniel Petkovsek
(74) *Attorney, Agent, or Firm*—Harness, Dickey & Pierce, P.L.C.

(57) ABSTRACT

In one embodiment of the present invention, a method is disclosed of temporarily changing refractive index of an optical fiber containing a longitudinal electrode arranged in the cladding of said fiber along and parallel to the core of the fiber, wherein the change in refractive index is performed by applying a high voltage pulse to said longitudinal electrode, the high voltage pulse including a magnitude of at least 100 volts and a duration sufficiently short to prevent melting of the electrode, such that the electrode thermally expands through ohmic heating without melting and exerts a pressure on the fiber core to induce said temporary change of the refractive index. The method is suitably used for Q-switching a fiber laser.

9 Claims, 10 Drawing Sheets

U.S. PATENT DOCUMENTS 6,221,565 B1    4/2001    Jain et al.
6,534,248 B2 *    3/2003    Jain et al. .................. 430/321
6,973,247 B2 *    12/2005    Fokine et al. ............... 385/123
2005/0157993 A1    7/2005    Fokine et al.

OTHER PUBLICATIONS

International Preliminary Report on Patentability and Written Opinion dated Nov. 11, 2008 for corresponding International Application No. PCT/SE2007/000449.

* cited by examiner

METHOD FOR CHANGING REFRACTIVE INDEX OF AN OPTICAL FIBER BY APPLYING A HIGH VOLTAGE PULSE TO A LONGITUDINAL ELECTRODE

TECHNICAL FIELD

The present invention relates to a method of temporarily changing the refractive index of an optical fiber.

BACKGROUND

Fiber lasers experience a tremendous growth in industrial applications. In marking, drilling, welding and many other fields it is economically advantageous to use fiber lasers, which have the highest power usage efficiency and lowest running costs among all high power laser systems. In many of these applications, it is useful to limit the heat deposited on the material being processed to avoid thermal damage and burning. Thus, lasers for marking and welding are often operated in a pulsed mode. In contrast to laser diodes that can be pulsed by rapidly altering the driving current, fiber lasers are difficult to gate. Ideally, one wants to accumulate a large amount of energy from the pump sources, and then quickly switch the laser on by altering the quality (Q) factor of the cavity, so that a high power high energy laser pulse is generated, often known as Q-switching.

One way of altering the light guiding properties of an optical fiber is to use internal electrodes within the fiber, and to apply a voltage across these electrodes in order to affect the refractive index properties of the fiber. The influence may be through the electro-optic effect or through induced mechanical stress in the fiber.

As a general background, reference is made to WO 03/005081, which discloses a method of altering the refractive index of an optical fiber by passing an electric current through an internal electrode arranged along the fiber core. Thermal expansion of the electrode induces mechanical pressure on the core, causing the refractive index to change due to the photo-elastic effect. One potential drawback of the technique, however, is that the rate at which the refractive index can be changed is limited, since the principle is based on thermal effects. Moreover, the electrode must at all times be prevented from melting, because the pressure exerted by the electrode on the fiber core more or less disappears if the electrode melts. Therefore, the current passed through the electrode is limited to about 100-200 mA.

SUMMARY

It has now unexpectedly been found that a very fast change of the refractive index can be obtained in an optical fiber with an internal electrode when a high voltage/current pulse of very high magnitude and very short duration is applied to the electrode. The change in refractive index may, for example, be used for inducing birefringence in the fiber, for altering polarization properties of light propagating in the fiber, or for changing the Bragg wavelength of a Bragg grating written into the optical fiber.

According to the present invention, a voltage and an ensuing electric current of high magnitude are employed for rapidly heating the electrode, such that it exerts a pressure (induces a strain) in the surrounding fiber material, typically the cladding and core of the fiber. The voltages/currents used according to the present invention are of such magnitude that if the electric pulse applied to the electrode was to remain for a prolonged period of time, the electrode material would completely melt. However, according to the present invention, the pulse applied to the electrode has a limited duration in order to prevent melting of the electrode material.

More specifically, according to the present invention, a temporary change of the refractive index in an optical fiber is effected by applying a high voltage pulse to the electrode, said high voltage pulse having a magnitude of at least 100 V and a duration sufficiently short to prevent melting of the electrode, such that the electrode thermally expands through ohmic heating without melting and exerts a pressure on the fiber core to induce said temporary change of the refractive index.

Typically, a voltage pulse of at least 100 V, preferably at least 500 V, is applied to the electrode for a duration of less than 100 ns. As one practical example, a voltage pulse of about 1 kV is applied for a duration of about 30 ns. For an electrode having a resistance of about 50 Ohm between the electrical connections (which is typical for a BiSn electrode of about 7 cm length between connections and about 28 µm diameter, as disclosed herein), such electric pulse will cause a current of about 20 A to flow through the electrode; however, due to the short duration of about 30 ns, melting of the electrode material is prevented and a very fast temporary change of the refractive index is obtained.

The rise time of the voltage/current pulse is not a crucial factor. However, the rise time is typically less than about 10 ns, or even less than about 5 ns.

It should be understood that although heat is used for the inventive method, the refractive index of the optical fiber can be changed on a nanosecond scale. The underlying reason is that the electrode itself is rapidly heated and thus expands, exerting a pressure on the surrounding fiber material, but the process is sufficiently fast in order for thermal diffusion from the electrode into the fiber material can be largely disregarded, and melting of the electrode material is prevented. Since temporary changes of the refractive index can be obtained on the nanosecond scale, the inventive method may be used for Q-switching of fiber lasers. In other words, although the physical process behind the inventive method is heat generation—usually associated with slow mechanisms and long time scales—the inventive method of switching is very rapid, and therefore it can be employed for entirely new applications. One attractive application where the inventive method is envisaged to be employed is, as mentioned above, Q-switched fiber lasers.

By applying a pulse of very high voltage/current to the electrode for a short duration, new and unexpected effects with respect to refractive index changes are obtained. This will be explained in detail below.

BRIEF DESCRIPTION OF THE DRAWINGS

In the following detailed description, reference will be made to the accompanying drawings, on which:

FIG. 20b shows the polarimeter trace on the polarization sphere.

DETAILED DESCRIPTION

Figure 1:
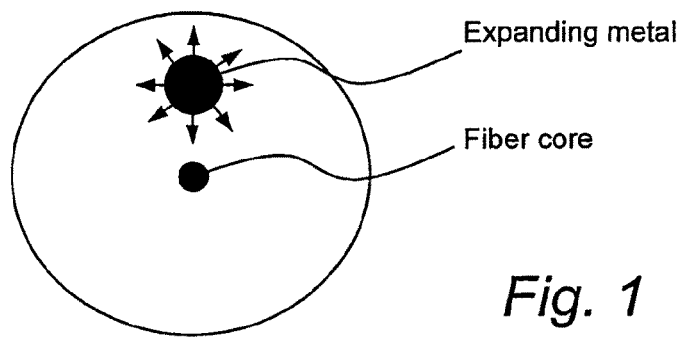
FIG. 1 shows schematically the basic principle of an expanding electrode causing strain in an optical fiber, said strain in turn giving rise to or altering a birefringence in the fiber.
Figure 2:
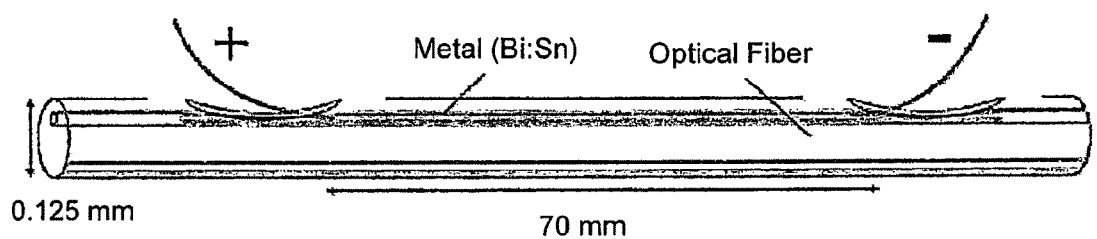
FIG. 2 shows a polarization control according to the present invention, made from 125 µm diameter fused silica fiber with an internal metal conductor.

An introduction to the inventive type of polarization controls will first be given. The concept of polarization controls with internal electrodes is based on the principle that metal expands more than glass under heating. FIG. 1 shows schematically the basic principle. An electrode comprised of metal is subjected to a voltage pulse, and the induced heating causes the electrode to expand. This expansion, in turn, causes strain in the fiber which gives rise to or alters a birefringence in the fiber core. FIG. 2 shows how an electrode is placed along the fiber core and connected in both ends. The metal electrode is pumped into the fiber using high pressure under heating and the connections are made by polishing the fiber cladding down such that the electrode is exposed.

Figure 3:
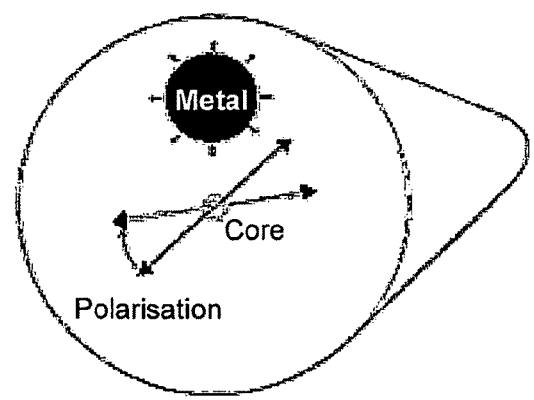
FIG. 3 is a schematic figure showing the polarization change due to conductor expansion.

When applying voltage to the conductor the metal expansion, due to heating, induces a pressure in the glass. The deformation of the light guiding glass core changes the atomic separation which results in refractive index change and birefringence. One slow and one fast axis is generated which phase shift the E-field components. If guided light has a polarization not perpendicular or parallel to the birefringence axis, the applied voltage over the conductor results in a polarization shift, see FIG. 3.

Using a DC current, less than 100 mA trough the conductor results in several π-phase shifts, but here, in contrast, it is shown experimentally according to the present invention that the explained technique is also valid for short, high voltage/current pulses.

To understand the polarization switch we need to investigate what type of physical processes that can cause a polarization shift and how much to expect. This disclosure will cover theory and calculations for three predicted physical processes.

The expansion of the conductor, causing a mechanical change

Oscillations due to fast expansion

Heat gradient over the core generating a refractive index change

All these processes are induced by the heat increase of the conductor due to the high voltage pulse.

First, we will cover the basic theory of the estimated temperature increase due to the applied voltage. Calculations are made with the help of energy conservation. The inserted energy to the conductor is given by $$Q = V^2 \cdot \Delta t / R \quad (1)$$

where R is the Bi:Sn conductor resistance, Δt the length of the electrical pulse and V the voltage. Since the high voltage pulse is nanoseconds long we can consider the conductor to be thermally isolated. If no heat leaves the system, equation (1) is equal to $Q = mC_V \Delta T$ where m is the mass of the conductor and $C_V$ the specific heat. This results in a temperature increase $$\Delta T = V^2 \cdot \Delta t / R m C_V. \quad (2)$$

This calculation assumes that the HV pulse is impedance matched to the component, otherwise the pulse will be partly reflected. The transmitted voltage $V_T$ over the conductor/load is given by $V_T = V_i \{2 Z_I/Z_i + Z_I\}$ where $Z_i$ is the input impedance and $Z_I$ the conductor impedance. Impedance matching can be obtained by adjusting the length of the conductor. In our case the component was connected with 50Ω coaxial cable which requires a 7 cm long, 30 μm diameter conductor made of $Bi_{47}{:}Sn_{53}$.

One example will now be presented, showing the temperature increase due to a 30 ns high voltage pulse. The following calculation shows the upper limit of temperature increase that one can expect in a thermally isolated 7 cm electrode ($Bi_{47}$:$Sn_{53}$) with 30 μm diameter.

TABLE 1

Data for calculations of temperature increase due to high voltage pulse.

| $C_v$ = 167 [J/(kgK)] | $\Delta t$ = 30·$10^{-9}$ [s] | R = 50 Ω |
|---|---|---|
| ρ = 8900 [kg/$m^3$] | m = π $r^2$ L ρ = 50·$10^{-8}$ [kg] | |

Data from table (1) inserted in equation (2) gives $$\Delta T = 7.2 \cdot 10^{-6} V^2. \quad (3)$$

Typical high voltage values of 0.5-1.5 kV was used in the following experiments which increases the temperature of a few ° C. Melting point for ($Bi_{47}$:$Sn_{53}$) is 137° C. which is reached with a 4 kV, 30 ns pulse in room temperature shown in table (2).

TABLE 2

Temperature increase of 30 ns high voltage pulse.

| Voltage (kV) | 0.5 | 1 | 1.5 | 2 | 3 | 4 |
|---|---|---|---|---|---|---|
| ΔT (° C.) | 1.8 | 7.2 | 16 | 29 | 65 | 115 |

The effect of the expanding metal will now briefly be discussed. When the conductor is heated it will expand and deform the glass, this process can in a static situation be simplified to a system with three springs mounted together between two fixed points, see FIG. 4.

Figure 4:
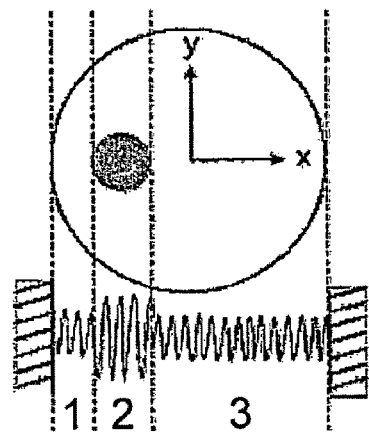
FIG. 4 shows the fiber/conductor interaction in a simplified model using three springs.
Figure 5:
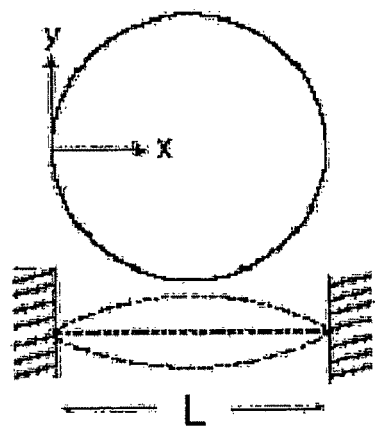
FIG. 5 shows the acoustic waves in a simplified model using standing waves in a string.

As a first stage we will calculate how much the conductor, spring No. 2 according to FIG. 4, will expand under heating in free space. A temperature change of ΔT causes an expansion $\Delta I_{metal} = a\, I_{metal}\, \Delta T$ where a is the expansion coefficient (a=16·$10^{-6}$ [$K^{-1}$]) for the used alloy ($Bi_{47}$:$Sn_{53}$) and $I_{metal}$ the conductor diameter. A theoretical spring is determined by the well-known equation F=−k·x where k is the spring constant and x the distance from equilibrium. The analogue equation using Young's modulus Y[N.$m^{-2}$] is $$F = -\{YA/L_c\} \cdot x, \quad (4)$$

where A is the contact area between the conductor and the glass and $L_c$ the length of the conductor. Newton's third law gives the relation $$F_{metal \to glass} = F_{glass \to metal}$$

or using equation (4)

$$\Delta I_{glass} \cdot Y_{glass} A/L_c = \Delta I_{metal} \cdot Y_{metal} A/L_c$$

which gives the expansion of the glass $$\Delta I_{glass} = \Delta I_{metal} \cdot Y_{metal} / Y_{glass}$$

We can now estimate the strain ε in the x- and y-direction defined in FIG. 4.

$$\epsilon_{xx} = \Delta I_{glass}/I_{glass},$$

where g is the Poisson ratio constant. The strain will cause a refractive index change that can be calculated using the equations $$\Delta n_x = -n^3/2(p_{11}\epsilon_{xx} + p_{12}\epsilon_{xx})$$

$$\Delta n_y = -n^3/2(p_{11}\epsilon_{yy} + p_{12}\epsilon_{xx})$$

where $p_{11}$ and $p_{12}$ are the strain-optical constants, or the Pockels coefficients [6]. If a 45 degrees linear polarized light passes the core the relative change of refractive index is $$\Delta n = \Delta n_x - \Delta n_y = B\epsilon_{xx} - B\epsilon_{yy} = B(130\, g)\epsilon_{xx}$$

where B=−$n^3$/2 ($p_{11}$+$p_{12}$) is called the stress optical coefficient. The relations above give $$\Delta n = B(1+g)\epsilon_{xx} = B(1+g)a\Delta T I_{metal} \cdot Y_{metal}/I_{glass} \cdot Y_{glass} \quad (5)$$

A numerical example of the change in refractive index, Δn, caused by a static pressure can be found as follows. Values from table (3) inserted in equation (5) give $$\Delta n = 0.25 \times 10^{-6} \Delta T$$

and the maximum phase shift Δφ[rad] as a function of temperature change is $$\Delta\phi(\Delta T) = (2\pi \Delta n L_c)/(n\lambda) = 0.07 \Delta T$$

where λ is the wavelength of the incident light.

This shows that with a temperature increase of 50 degrees one can expect around one π-shift change for light polarized 45 degrees in the coordinate system shown in FIG. 4.

TABLE 3

Numerical values for the calculation of polarization due to static pressure.

| $p_{11}$ = 0.12 | $p_{12}$ = 0.27 | n = 1.5 |
|---|---|---|
| g = 0.12 | a = 16 × $10^{-6}$ [$K^{-1}$] | λ = 1.5 × $10^{-6}$ [m] |
| $Y_{glass}$ = 72 × $10^{10}$ [N/$m^2$] | $Y_{metal}$ = 12 × $10^{10}$ [N/$m^2$] | $L_c$ = 0.1 [m] |
| $I_{metal}$ = 30 × $10^{-6}$ [m] | $I_{glass}$ = 90 × $10^{-6}$ [m] | |

It may be useful for the understanding of the present invention to know the effects of a fast expansion of the metal. A short high voltage pulse causes the conductor electrons to move. This electronic energy will eventually be transformed to thermal motion, which will cause an expansion. We have found in literature that this energy conversion occurs in picoseconds [1, 2], which can be seen as instantaneous compared to the 4 ns rise time of the electrical pulse. An instantaneous expansion of the conductor results in the creation of tangential and longitudinal acoustic waves. Only the acoustic waves perpendicular to the propagation direction will be investigated since the length of the component is 500 times the diameter. The radial acoustic waves are reflected at the fiber surface and standing waves of certain period time is created. The acrylic coating will damp the oscillation, but in the following theory the coating is neglected. We propose two different methods for the frequency calculation.

Speed of sound calculation
Solution of the Christoffel equation for purely radial displacement A basic approximation of the fundamental period time can be made by using the known values for speed of sound in glass and Bi:Sn to calculate the traveling time for an acoustic wave from the core, reflected at the fiber surface and back to the core. The period time between polarization change due to pressure change in the core is then given by p=d/V where d is the diameter of the fiber and V the velocity of sound in fused silica. This calculation result in half the period time of what we have experimentally measured and the following example will clarify this.

Our cylindrical fiber can be approximated with a one-dimensional mounted string with length L equal to the fiber diameter d, and with an acoustic longitudinal velocity V. The string will have a fundamental mode consisting of two identical waves traveling in opposite direction with the speed V and wavelength 2L. The displacement function for the mounted string oscillating in fundamental mode is given by the sum of these two waves.

$$u(x,t)=\cos(\pi x/L+\omega t)+\cos(\pi x/L-\omega t)$$

which with trigonometric relations can be simplified to $$u(x,t)=2\cos(\pi x/L)\sin(\omega t).$$

this means that the period p of the fundamental mode is $$p=2L/V==2d/V$$

and thus two times the period of what one first expects.

The calculation for a standard telecommunication fused silica fiber with $V_{glass}$=5720 m/s and $d_{glass}$=125×10$^{-6}$ m, gives a period time p=43 ns.

A simplified calculation can easily be made for one and two Bi:Sn internal electrodes by changing a part of the glass to Bi:Sn.

$$P=2[(d_{glass}-d_{metal})/V_{glass}+d_{metal}/V_{metal}],$$

where $V_{metal}$=3000 m/s is the velocity of sound in Bi:Sn and $d_{metal}$ is the radius of the conductor. With one electrode of diameter $d_{metal}$=3×10$^{-6}$ m the period is calculated to $p_{one}$=53 ns, and with two electrodes $p_{two}$=63 ns. So we could expect fundamental oscillations with a period time around 40-60 ns.

The radial wave equation and the boundary conditions are simplified if we first consider a fiber without electrodes. We will also concentrate on the radial oscillations, which is not an obvious approximation since a pure radial displacement changes the refractive index symmetrically over the core and induces no polarization change. The real fiber symmetry is not symmetrical and we can therefore expect oscillation frequencies near the pure radial solution, which motivates the approximation. The three material constants that affect the pure radial oscillations are Density [kg/m$^3$]
Young's Modulus [N/m$^2$]
Stiffness coefficients $c_{11}$ and $c_{12}$ [N/m$^2$]

Young's Modulus and density determines the speed of sound and the stiffness coefficients affect the boundary condition at the end surface and in the interaction surface between materials. The difference between Young's Modulus and Stiffness constants in a homogeneous material is the direction dependent distribution of strain by applied pressure. Data for $c_{11}$ and $c_{12}$ are available for fused silica, Bi [3] and Sn [4] separately, but the metal constants are not too much of a help since the alloy Bi:Sn may have totally different properties. Values of Young's Modulus shows the difference in properties between the metals and the alloy.

The used equations arise from the Christoffel equation [7]

$$c_{44}\nabla^2 u+(c_{11}-c_{44})\nabla(\nabla\cdot u)=\rho d^2 u/dt^2. \quad (6)$$

and are solved with the help of potential theory [1]. The displacement vector u(r,t) is represented by a sum of two terms $$u(r,t)=\nabla\Phi(r,t)+\nabla\times\Psi(r,t) \quad (7)$$

where $\Phi$(r,t) is the scalar potential and $\Psi$(r,t) the vector potential. If we assume that u(r,t) has independent spatial and temporary variables, we can decouple the equation with the substitution $$u(r,t)=u(r)e^{i\omega t} \quad (8)$$

where $\omega$ is the angular frequency.

Insertion of (7), (8) into (6) results in two equations, one for each potential. In this case we are satisfied with the scalar potential since it is enough to determine the fundamental frequencies $\omega$. The equation for the scalar potential $\Phi$(r) is $$\nabla^2\Phi(r)=-(\omega/V_l)^2\Phi(r)$$

where $V_l$ is the longitudinal velocity of acoustic waves in the material. The full solution is $$\Phi(r,\phi,z)=(aJ_n(k_l r)+bY_n(k_l r))(\sin(n\phi)+\cos(n\phi))e^{ikz} \quad (9)$$

$$k^2+k_l^2=(\omega/V_l)^2 \quad (10)$$

where $J_n$(x) and $Y_n$(x) are Bessel functions of first and second order, respectively. Since we only are interested in the frequencies the $\phi$ and z dependence of $\Phi$ can be neglected to simplify the calculations. The coefficients a and b are constants defined by the boundary conditions below. At the end surface and between different materials both the tangential and normal stress $\sigma$[N/m$^2$] components must be continuous. For purely radial motion the boundary conditions are reduced to one equation arising from the tensor $$\sigma_{rr}=c_{1111}\epsilon_{rr}+c_{1122}\epsilon_{\phi\phi}=c_{11}\epsilon_{rr}+c_{12}\epsilon_{\phi\phi}$$

where $\epsilon_{rr}$, $\epsilon_{\phi\phi}$[$\Delta$l/l] is the strain due to pure radial displacements given by $$\epsilon_{rr}=du/dr, \epsilon_{\phi\phi}=u/r,$$

which gives the boundary condition $$c_{11}du/dr+c_{12}u/r|_{r=R}=0, \quad (11)$$

where R is the surface radius. If there is more than one material present the boundary conditions are $$u^{(i)}(r)=u^{(i+1)}(r)|_{r=R^{(i)}}$$

$$c_{11}^{(i)}du^{(i)}/dr+c_{12}^{(i)}u^{(i)}/r=c_{11}^{(i+1)}du^{(i+1)}/dr+c_{12}^{(i+1)}u^{(i+1)}/r|_{r=R^{(i)}}$$

Figure 6A:
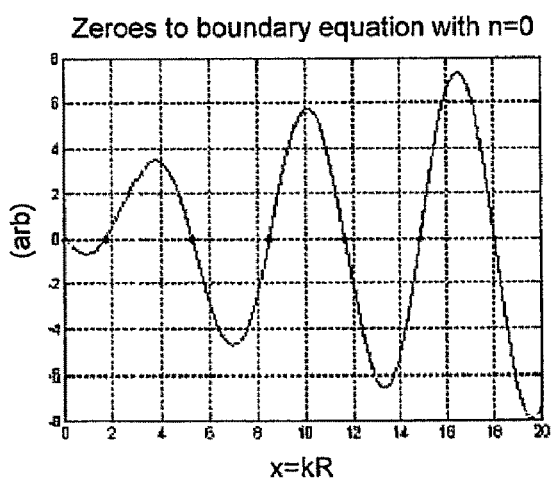
FIG. 6a shows the solution to the boundary condition for equation (13) where n=0.
Figure 6B:
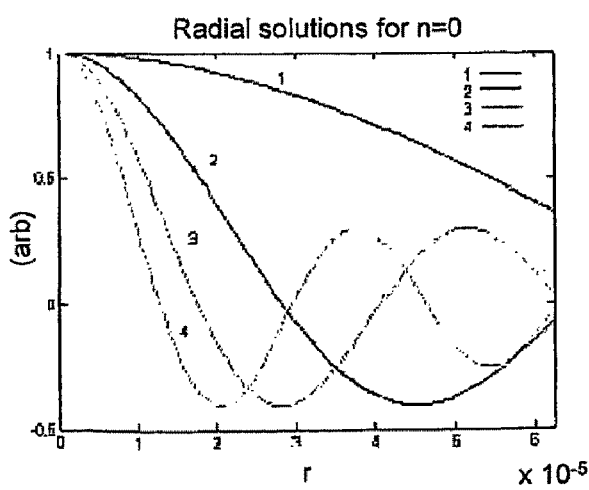
FIG. 6b shows the radial solutions to Christoffel's equation (6). The plots 1, 2, 3 and 4 correspond to the solution-number (m) for the boundary equation (13) with n=0.

A calculated example of the period time is now given with reference to FIGS. 6a and 6b. First we will approximate the fiber and conductor to a cylindrical geometry with uniform material of fused silica. The pure radial displacement solution (9) must be finite when r=0, which gives b=0 and with (7) u(r) can be written as $$u(r)=\nabla^2\Phi(r)=ad/dr[J_n(k_l r)]=ak_l\frac{1}{2}[J_{n-1}(k_l r)-J_{n+1}(k_l r)] \quad (12)$$

The boundary condition for one free surface at r=R is given by (11) $c_{11}ak_l^2\frac{1}{4}[J_{n-2}(k_l R)-2J_n(k_l R)-J_{n+2}(k_l R)]+c_{12}ak_l\frac{1}{2}(J_{n-1}(k_l R)-J_{n+1}(k_l R))=0$.

Replacement of x=$k_l$R leads to $$c_{11}x\frac{1}{2}[J_{n-2}(x)-2J_n(x)-J_{n+2}(x)]+c_{12}(J_{n-1}(x)-J_{n+1}(x))=0 \quad (13)$$

Every n corresponds to an infinite number of solutions for $x_m$, FIG. 6 shows the first zeroes for equation (13) with n=0.

From these results equation (10) gives the period time $k^2+k_l^2=(\omega/V_l)^2$ where k=0 because of z-independence and $k_f = x_m/R$, where index m indicates the solution number. For the fundamental mode, n=0 and m=1, the period time is $$p = 2\pi/\omega = 2\pi/(k_f V_f) = 2\pi R/(x_f V_f) = (2\pi \cdot 62.5 \cdot 10^{-6} \, [\text{m}])/(1.75 \cdot 5720 \, [\text{m/s}]) = 39.2 \times 10^{-9} \, \text{s}.$$

Table (4) also contains additionally calculations of the period with one and two conductors present. These calculations are made by assuming a symmetrical geometry and increasing the radius to an amount corresponding to the difference of longitudinal velocity between the Bi:Sn conductor and fused silica. The radius corresponding to the fiber with one electrode is $$R_{one} = (R - d_{metal}/2) + d_{metal}/2 \, V_{glass}/V_{metal} = \frac{1}{2}[(125-30) + 30 \cdot 5720/3000] \times 10^{-6} = 76 \times 10^{-6}$$

where $d_{metal}$ is the diameter of the conductor. The radius is increased 13.6 µm for one conductor and 27.2 µm for two conductors, period time calculations are shown in table (4).

TABLE 4

Calculated period time for fundamental oscillations n = 0, for the solution to equation (6).

| Mode number | 1 | 2 | 3 | 3 |
|---|---|---|---|---|
| Period Time (ns) No Electrode | 39.2 | 12.9 | 8.0 | 5.9 |
| Period Time (ns) One Electrode | 48.6 | 16.0 | 10.0 | 7.3 |
| Period Time (ns) Two Electr. | 61.1 | 20.2 | 12.6 | 9.2 |

In the following paragraphs, the heat generated in the conductor and in the fiber will be discussed. The heat is deposited in the conductor during a few nanoseconds long high voltage pulse. All this heat will eventually leave the fiber and during this process the heat flow creates a temperature gradient over the core, which changes the index of refraction for different polarizations. This effect adds to the compression of the core due to the expansion of the electrode, and is therefore difficult to experimentally verify. Following calculations gives an estimation of the possible induced polarization change by two methods.

Static heat gradient in cylindrical geometry

One dimensional heat flow Matlab simulation

Both these calculations shows polarization shift which is verified with experiments in the following chapter.

This calculation will investigate how a heated conductor may affect the polarization state in a static situation. If we assume that the temperature of the conductor and the boundary is known, the heat gradient in fiber can be calculated with Fourier's Law $$dQ/dt = -A\gamma \nabla T,$$

where $\gamma[Wm^{-1}K^{-1}]$ is the thermal conductivity and A the area, in this case a cylinder surface. If we add power $P[Js^{-1}]]$ to the conductor continuously the equation simplifies to $$P = -2\pi r L \gamma dT/dr$$

where L is the length of our device. Division with r and integration on both sides leads to $$P \ln(r) = T(r) 2\pi L \gamma + C.$$

This can be rewritten as $$T(r) = a \ln(r/b) + c$$

where the constants a, b and c include the material constants and are fully determined by the boundary conditions. Further more the index of refraction change in the glass due to temperature is given by the relation $\Delta n(r) = k\Delta T(r)$ where k is a material constant ($k=12 \times 10^{-6}[K^{-1}]$ for fused silica).

To calculate the polarization shift we need to find the average change in both x- and y-polarized light. This can easily be made if we approximate the Gaussian optical field distribution with a step function $O(r) = 1$ for $0 < r < R$ $O(r) = 0$ for $r > R$.

Figure 7:
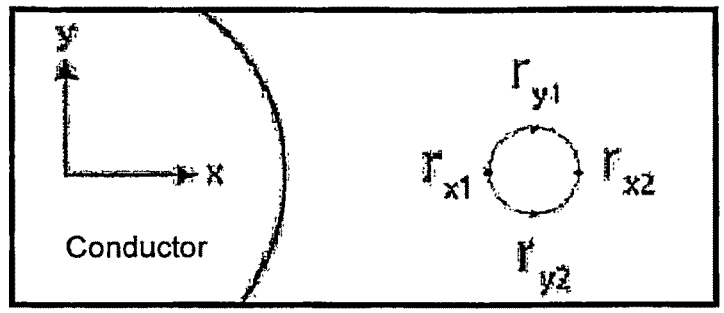
FIG. 7 shows the coordinates used in the refractive index integral.

The width R of the approximated light distribution is for example chosen to be half the size of the core. The index change can be approximated with the integration of dn(r)/dr. O(r) over the core for x- and y-direction separately.

$$\Delta n = \Delta n_x - \Delta n_y = ka\Delta T[\ln(r_{x1}/b) - \ln(r_{x2}/b) + \ln(r_{y1}/b) - \ln(ry_1/b)] = \ln(r_{x1}/b)\ln[(r_{x1}r_{x2})/(r_{y1}r_{y2})]$$

where $r_{x1}$, $r_{x2}$, $r_{y1}$, and $r_{y2}$ are coordinates defining the step-function and are shown in FIG. 7.

This results in a maximum phase shift $\Delta\phi = 2\pi \Delta n \, L/n\lambda$, where L is the length of the component and λ the wavelength.

Figure 8:
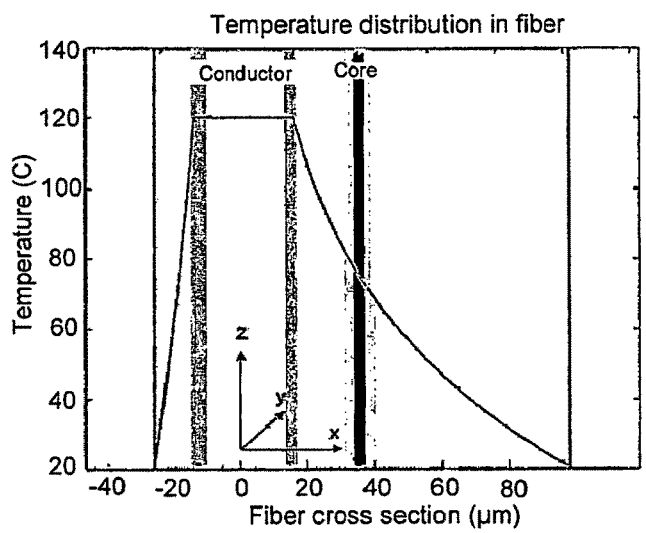
FIG. 8 shows the temperature distribution in the fiber due to heating of the conductor.
Figure 9A:
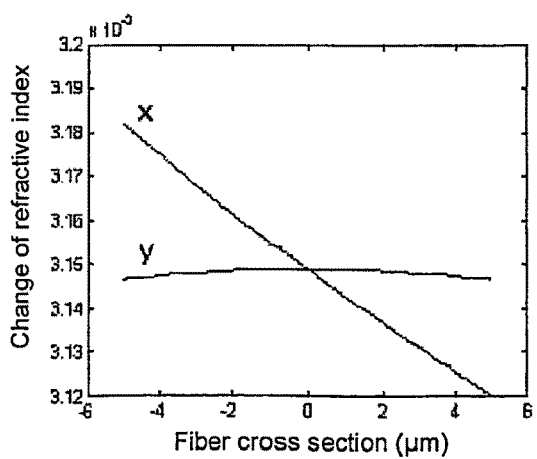
FIG. 9a shows the refractive index change Δn over the core of the fiber for light polarized in x- and y-direction.
Figure 9B:
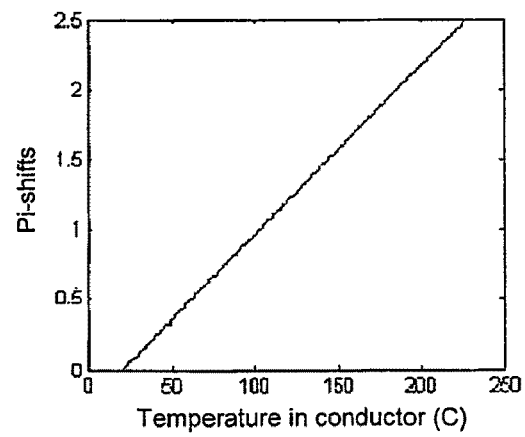
FIG. 9b shows the number of π-shifts as a function of conductor temperature only due to thermal gradients.
Figure 10:
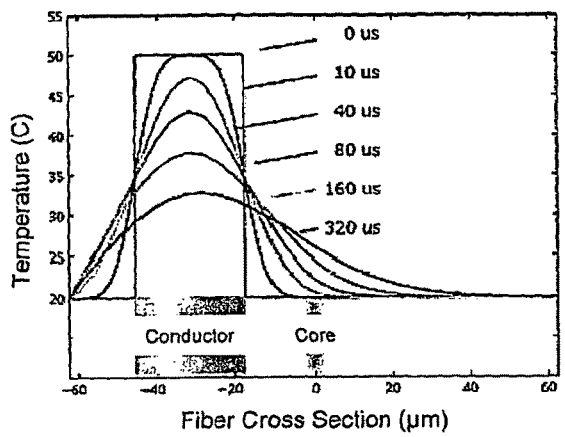
FIG. 10 shows the temperature distribution after heating the conductor.

By applying voltage over the conductor the metal is heated up to 120° C. and the outer boundary is assumed to work as a heat sink with constant temperature of 20° C. In reality though, the boundary material is air or acrylic coating and does not work as a heat sink. The calculated temperature distribution is shown in FIG. 8.

If we approximate our heat gradient over the core with a linear function, the average change of refractive index will be the same for all polarizations. In our cylindrical symmetry though, it shows that under perfect conditions a polarization shift due to a static heat gradient over the core can be obtained. Further experiments will show that the temperature change in the conductor of the best component is only a few degrees ° C., which makes the assumed static heat gradient contribution to the polarization change close to zero.

This section will display the solution of the time dependent heat gradient, which will give an estimation of the rise time of the predicted polarization shift due to heating. To simplify the calculations of the heat flow problem we will use a one dimensional geometry. This assumption is motivated by the previous calculation which shows that the linear problem result in less polarization shift than the cylindrical symmetry. The one dimensional temperature distribution T(x,t), is given by solving the partial differential diffusion equation $\nabla\Sigma$ $$\partial T/\partial t = k\nabla^2 T = \{\gamma/(c_v\rho)\}\partial^2 T/\partial^2 x \tag{14}$$

where k [s/m²] is the thermal diffusivity depending on thermal conductivity γ [$Wm^{-1}K^{-1}$], specific heat $c_v$[$J \, kg^{-1}k^{-1}$] and density ρ [kg/m³]. The initial and boundary conditions for our problem are chosen to be $T(0,x) = T$ for $a \leq x \leq b$ $T(0,x) = 0$ for other values of x.

$T(t,0) = T(t,d) = T2$, where T1 is the temperature of the heated conductor at t=0, T2 is the boundary temperature which is approximated to be constant and d is the diameter of the fiber. Equation (14) is solved by separation of variables which leads to the solution $$T(x,t) = T2 + \Sigma_{n=1 \to \infty} g_n \sin[(n+\tfrac{1}{2})\pi x/d] \exp\{-k[(n+\tfrac{1}{2})\pi/d]^2 t\} \tag{15}$$

where $g_n = (2/d)\int_{0 \to d} \sin[(n+\tfrac{1}{2})\pi x/d] T(0,x) dx = -2/[(n+\tfrac{1}{2})\pi]\{\cos[(n+\tfrac{1}{2})\pi b/d] - \cos[(n+\tfrac{1}{2})\pi a/d]\}$.

Solution (15) gives a time dependent temperature difference between the left and right side of the core in the x-direction given by $$\Delta T(t) = T(d/2-r,t) - T(d/2+r,t)$$

where r is the radius of the light guiding core. By assuming that light polarized in the y-direction is affected by the temperature increase equal to the fiber center x=d/2, one can approximate the maximum phase shift to $$\Delta\Phi = 2\pi\Delta n(t)L/(n\lambda) = 2\pi k L \Delta T(t)/(n\lambda) = 2\pi k L[T(d/2-r,t) - T(d/2+r,t)]/n\lambda.$$

Figure 11:
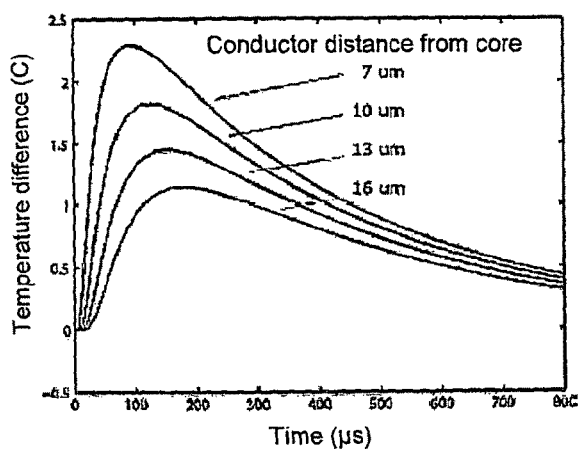
FIG. 11 shows the temperature difference between left and right side of the core with radius 4.5 μm for different core/conductor distance (7-16 μm).
Figure 22:
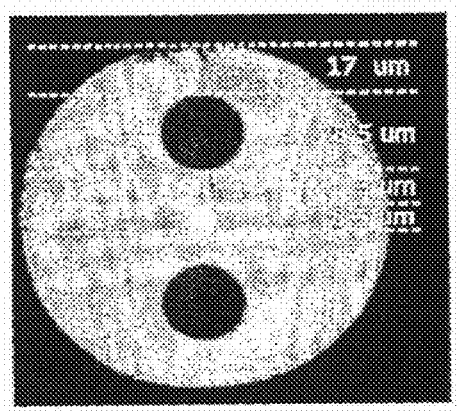
FIG. 22 shows the cross section of a fiber used for the heat gradient experiment.
Figure 23:
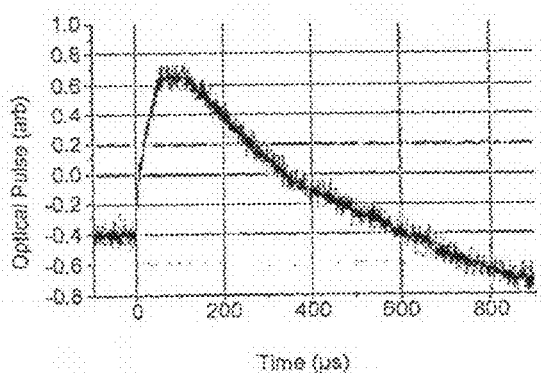
FIG. 23 shows the measured polarization shift due to assumed heat gradient.
Figure 24:
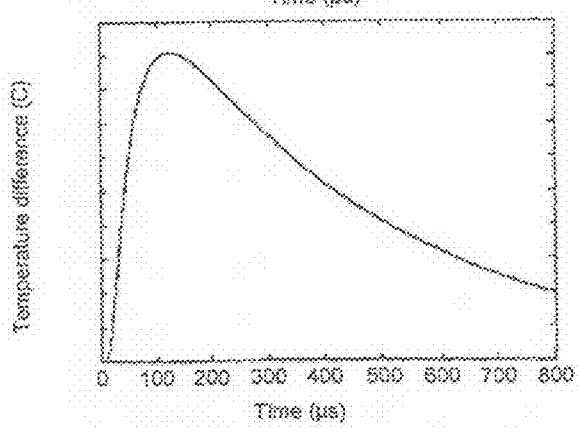
FIG. 24 shows simulated temperature difference between left and right side of the core due to the heat gradient.

Since solution (15) is a infinity summation of functions it is convenient to use a numerical program such as Matlab to visualize the result. The value of used constants is shown in table (5) and chosen to be equal the fiber geometry in FIG. 22. The simulation shows a slow process of heat flow with a maximum temperature difference over the core after 100-200 μs depending on fiber geometry. FIG. 11 shows the simulated temperature difference between left and right side of the core in the x-direction. This gives an time approximation of the polarization shift that would occur due to heat flow.

TABLE 5

Additional material constants for fused silica used in the calculation of the heat flow. Fiber dimensions equals FIG. 22.

| | | |
|---|---|---|
| $\gamma = 1.38$ [Wm$^{-1}$K$^{-1}$] | $c_v = 703$ [JKg$^{-1}$K$^{-1}$] | $\rho = 2200$ [kg m$^{-3}$] |
| $d = 125 \times 10^{-6}$ [m] | $a = 7 \times 10^{-6}$ [m] | $b = 44 \times 10^{-6}$ [m] |

The following paragraphs explain techniques used for determination of the processes discussed in the previous theory. The results are well correlated with the calculations and visualizes the properties of different components for future development. An extensive amount of experiments was carried out to achieve an understandable picture of the process. This chapter is a collection of the most proving and successful experiments.

Figure 12:
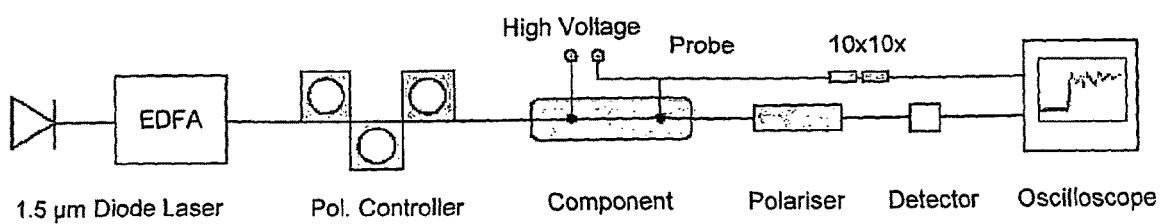
FIG. 12 shows the general set-up for determination of polarization change.
Figure 13:
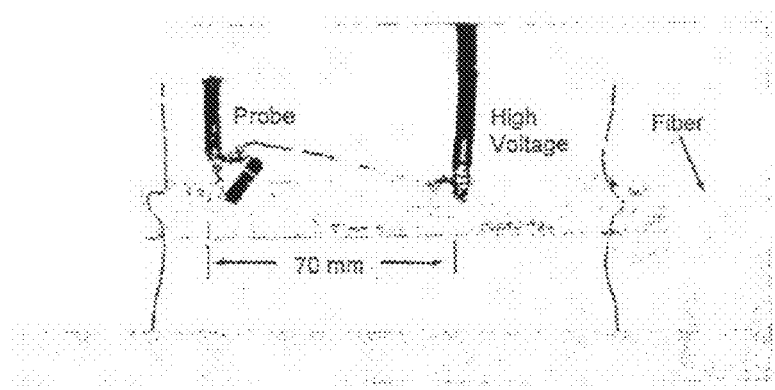
FIG. 13 shows a polarization switch component connected with two coaxial cables. The metal filled fiber is mounted on a PVC board to secure the construction and simplify the electrical connections.

The following experiments were carried out using the setup in FIG. 12. The diode laser emits polarized light which is amplified through the Erbium Doped Fiber Amplifier (EDFA). By adjusting the manual polarization controller one can optimize the output and visualize the different processes in the component. The probe is used to measure the high voltage pulse and give the oscilloscope a trigger signal. The electromagnetic noise from the component was in the beginning sufficiently higher than the measured optical signal but wrapping aluminum foil around the detector solved the problem. Another effective method of distinguishing the electrical noise from the optical signal proved to be insertion of an optical delay, for example 1 km fiber gives 5 μs delay. All the optical connections were made with standard fiber contacts to simplify the exchange of components.

Diode Laser: Lucent ME-2503F36
EDFA: NetTest, Fiberamp BT-17
Polarizer: General Photonics 1.5 μm
Oscilloscope: Tektronics TDS 3052, 2GS/s
Detector: S/N1057
HV Pulse Generator: See appendix Experiment 1—Acoustic Oscillations The acoustic oscillation explained in the previous theory is verified with following experiment. By making the same measurements with and without coating we can show that the observed oscillations are affected by the boundary condition and therefore must be acoustic oscillations in the fiber.

Figure 14:
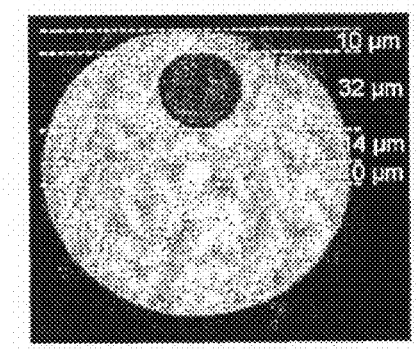
FIG. 14 shows a cross section of a fiber used for the acoustic oscillation experiment.
Figure 15:
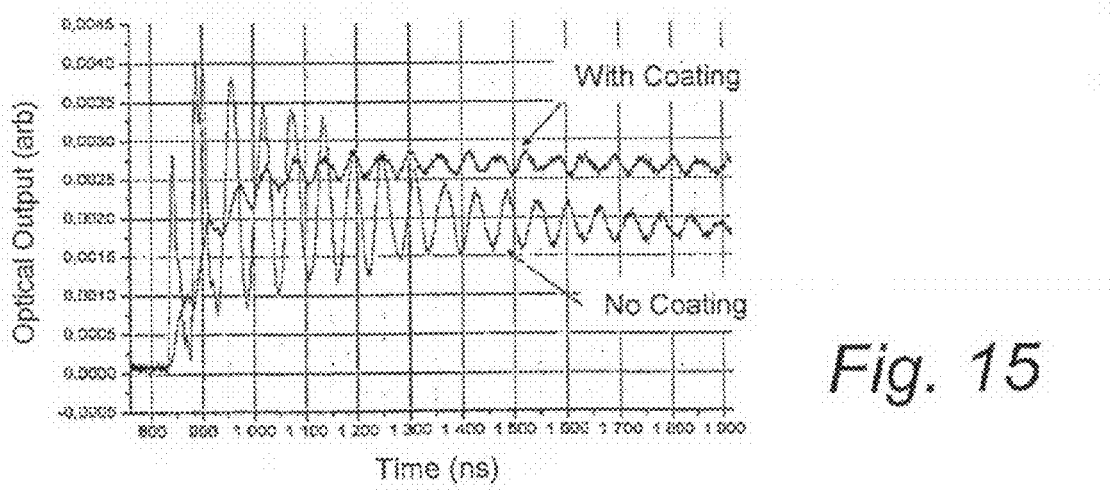
FIG. 15 shows the oscillations due to removed coating.
Figure 16:
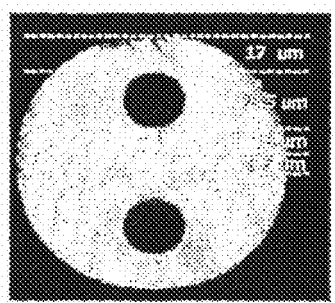
FIG. 16 shows the cross section of the fiber used for the pulse length dependence experiment. Both holes were filled with metal, but only one was connected to the high voltage.

The setup is shown in FIG. 12. The coating was removed using dichlorometane without changing the setup, which was necessary since the component responds different depending on input light polarization. The cross section of the used component is shown in FIG. 14. Other component data: 37 Ohm resistance, 5 cm internal Bi:Sn conductor.

The two transmission plots with and without coating verifies the fact that the oscillations have an acoustic resonance nature. Some fiber components shows bigger ability to establish acoustic oscillations than others, but no theory was experimentally confirmed since there were too many variables changed from component to component.

The average period time for this component without coating is around 53 ns (standard deviation=2 ns) which is well in the range of previous calculated 48 ns. One can also find small signs of the secondary frequency with a period time of 17 ns, corresponding to calculated value of 16 ns in table (4). The period time with coating is slightly shorter than without which does not correspond to the theory for damped oscillations [8]. However the change is so small that it may depend on a slightly changed geometry after removing the coating.

Experiment 2—Pulse Length Dependence

By varying the high voltage pulse length the process of pressure wave followed by acoustic oscillations, could be visualized experimentally.

The high voltage pulse generator explained in the appendix creates pulses with duration determined by the length of the short circuited coaxial cable. One meter gives a 10 ns pulse and two meters give the double pulse length. The experiment was carried out using coaxial cables corresponding to 30, 50, 100 and 300 ns pulses. Since the polarization tends to drift during the experiment all the measurements were made with the manual polarization controller adjusted to give maximum polarization shift. Other data: 47 Ohm resistance, 7 cm internal Bi:Sn conductor.

Figure 17:
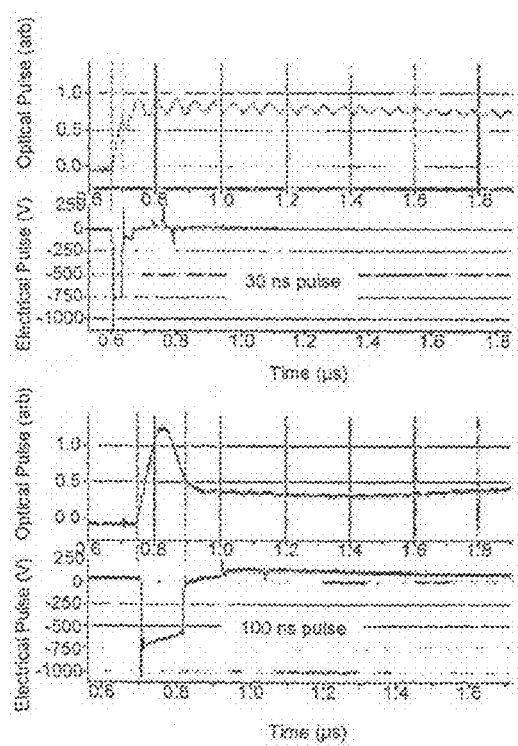
FIG. 17 shows the results with varying pulse length from 30 ns to 300 ns.
Figure 17:
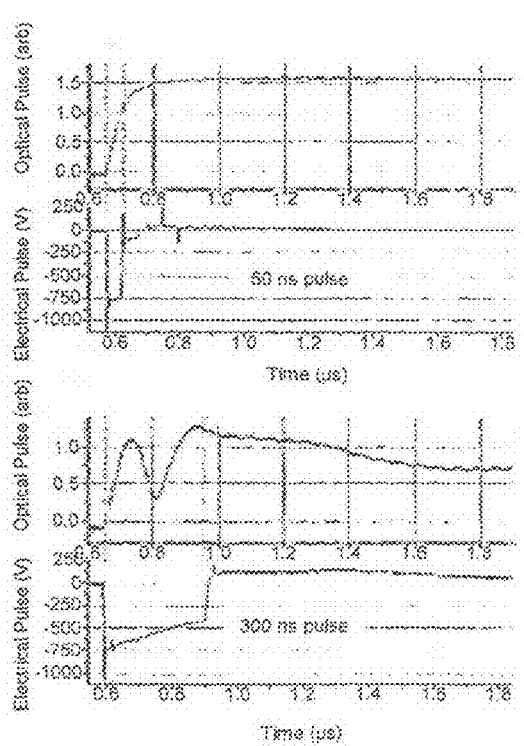

FIG. 17 shows how the transmission is changed by the electrical pulse length. The pressure wave follows the pulse length and changes the polarization by several π-shifts. As soon as the electrical pulse stops, small oscillations with a period time of 50-60 ns can be observed in the optical response.

Calculated temperature increase for different pulse length using equation (3) is:

30 ns, 750 V average→$\Delta T = 4°$ C.

50 ns, 750 V average→$\Delta T = 7°$ C.

100 ns, 650 V average→$\Delta T = 10°$ C.

300 ns, 600 V average→$\Delta T = 26°$ C.

As explained previously, the phase shift can be estimated by 0.07 ΔT which does not correspond to the results in this experiment which shows five times more π-phase shifts than in the static model. A temperature increase of $\Delta T = 26°$ C. gives experimentally 3π-phase shifts shown in FIG. 17, and calculation using the static spring model result in 0.6 π-phase shifts. The assumptions and simplifications in the spring model is probably the cause to this deviation.

Experiment 3—Polarization Dependence

The inventive component affect the polarization mainly by varying the index of refraction by deformation which creates slow (x) and fast (y) axes seen in FIG. 4. The maximum polarization change is theoretically achieved when the light is linear polarized 45 degrees to the x and y-direction. This symmetry also leads to two types of polarization states that is unaffected by the component.

Left- and right-circular polarization

Linear polarization parallel to x- or y-axis

The circular polarization has no specific direction and is therefore unaffected by the refractive index change, and the linear polarized light in x- and y-direction is just the principal birefringence axes.

Figure 18:
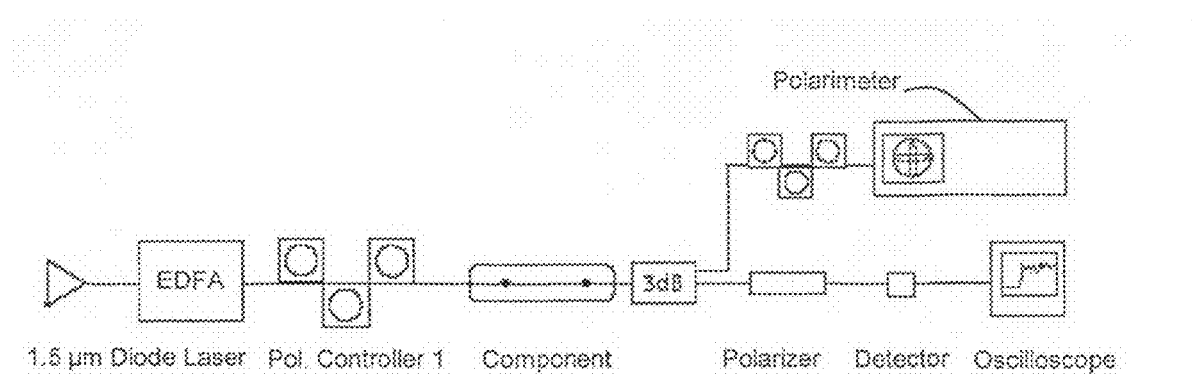
FIG. 18 shows the experimental set-up for determination of polarization dependence.

The setup is slightly changed from earlier experiments to enable polarization measurements using a polarimeter, seen in FIG. 18. Since the optical fibers from the component to the polarimeter does not maintain the polarization we can mainly measure the relative polarization change. Splitting the optical signal with a 3 dB fiber coupler before the polarizer also enables determination of the relative polarization rotation in the component during application of repetitive high voltage pulses.

Figure 19:
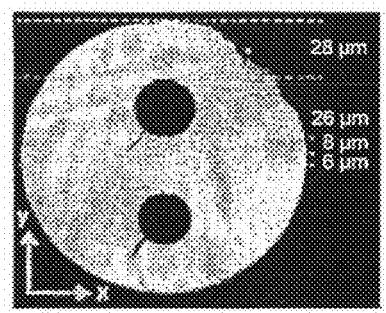
FIG. 19 shows the cross section of a fiber used for polarization dependence experiments.

One way of calibrating the polarimeter is to use the polarization dependent loss. If the electrodes is close enough to the light guiding core the component will have a polarization dependent loss with a minimum transmission for linear polarized light in the x-direction of FIG. 19, once this input polarization is determined the polarization controller after the component can be adjusted to give the same point on the polarimeter sphere.

Figure 20A:
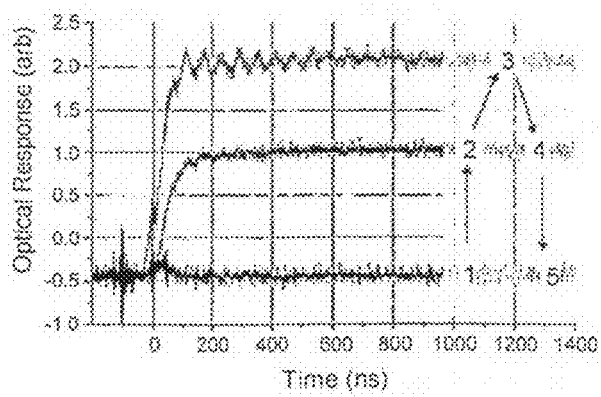
FIG. 20a shows transmission for different polarizations corresponding to numbers on the polarization sphere (cf.
Figure 20B:
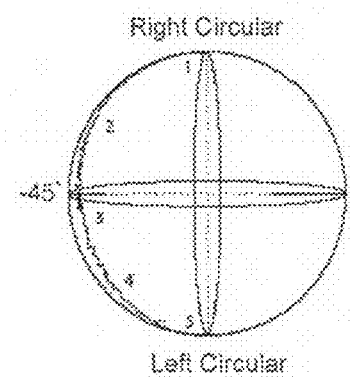
FIG. 20b).
Figure 21:
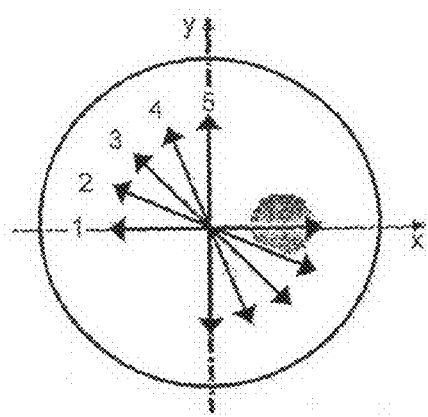
FIG. 21 shows the assumed linear polarization alignment in the fiber.

FIG. 20 shows the transmission due to different polarizations (left) and the polarimeter trace (right). The variable input polarization of transmission plot 1-5 is achieved by adjusting polarization controller 1. The polarimeter trace shows that the maximum polarization shift due to the high voltage pulse is phase shifted by 90° in relation to the minimum. The actual polarization in the component was difficult to measure due to low polarization dependent loss (1 dB extinction ratio) but two reasonable alignment is expected. One is just as the polarimeter trace shows, right/left circular polarization (1,5) is unaffected by the high voltage pulse and 45° linear polarization (3) gives the maximum response. The other possible alignment is shown in FIG. 21 which also has 180° phase shift between the two minimum responses, but linear polarized instead of circular.

Experiment 4—Heat Gradient

To verify the previous calculations of polarization change due to heat flow we must be able to distinguish the pressure from the heat gradient. This was experimentally achieved by replacing the Bi:Sn conductor, which filled the entire hole, to a thinner 10 μm diameter tungsten thread with less contact area to the glass. The tungsten thread was inserted to the 30 μm diameter hole by hand and connected in both ends without any glue or solder inside the hole.

The experiment setup is shown in FIG. 12. The high melting point of tungsten (3600 K) enabled the use of higher voltage than previous experiments with Bi:Sn conductor. The pulse generator was slightly adjusted to launch 6 kV pulses instead of earlier 1.2 kV. The component was made of the same fiber shown in FIG. 22. Other data: 10 cm long and 27Ω resistance.

The experiment clearly shows that polarization change due to heat flow can occur and the timescale of the result matches well with previous calculations shown above. Several times during the experiment the solder melted at the connection point which indicate of temperatures above 150° C.

EXAMPLE

Q-Switching

Since one of the target applications of the component described herein is in Q-switching of fiber lasers, certain features are of special importance, such as high extinction ratio, low loss, no acoustic oscillations and fast rise time. All these features were improved in the following component which shows the potential of the concept for Q-switching. This section will display the performance of a typical useful component.

Figure 25:
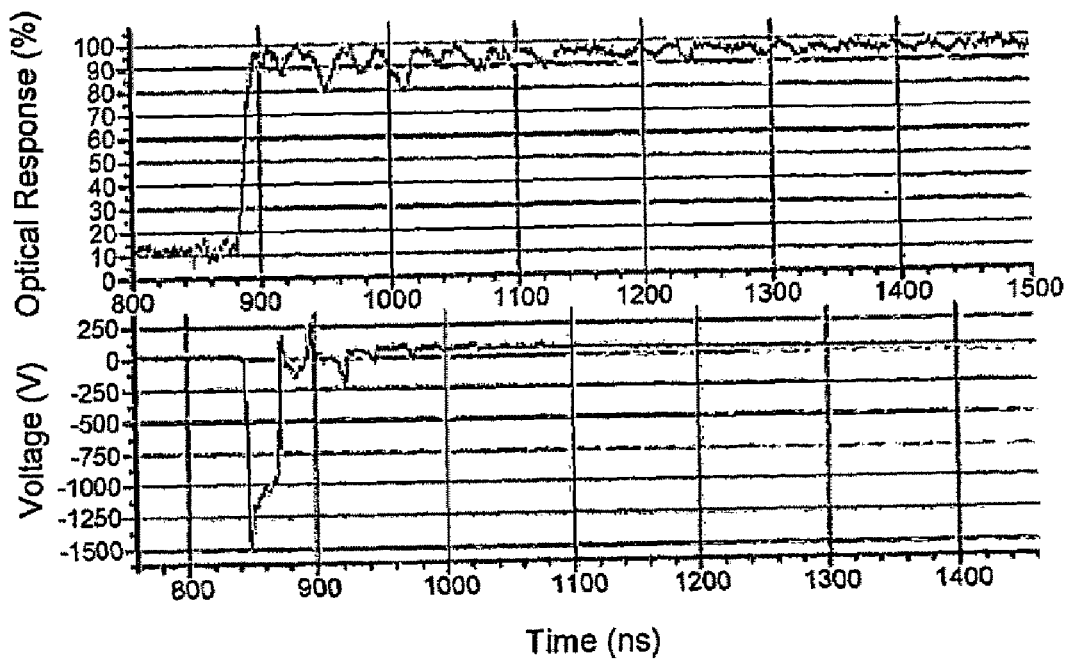
FIG. 25 shows the transmission of a component according to the present invention, suitable for Q-switching. Top graph: Optical response with 10 ns rise time. Bottom graph: 30 ns long, 1 kV electrical pulse with 4 ns rise time.

The insertion loss of the component including two splices to standard 1.5 μm single mode fibers was measured to 0.2 dB, which is the lowest of all built components. This low loss is mostly due to a symmetrical and large fiber core which enables low splice loss, and the absorption from the conductors is decreased with larger conductor distance (typical loss for components of the same length but with other fiber geometry is a few dB). FIG. 25 shows the result of transmission due to polarization change:

10 ns rise time

85% transmission change

Stable switch

Figure 26:
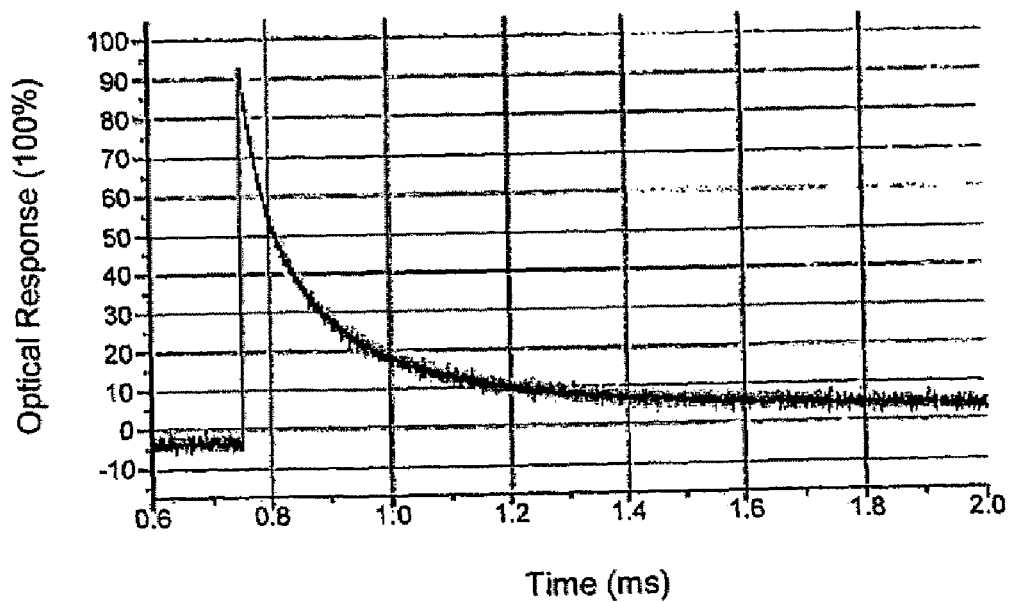
FIG. 26 shows a wide range plot for the same component as in FIG. 25.

The main problem left to solve is how to switch back from 100% to zero transmission faster than the obtained ms, see FIG. 26. The available pulse generator has a frequency limit of 100 Hz but we can estimate the maximum frequency before melting. From experiments we know that a component placed in room temperature melts at a DC voltage of $V_{max}$=15 V, this value corresponds to the maximum amount of energy leaving the component. By comparing this to the high voltage pulse average power, we can approximate the maximum frequency before melting.

The maximum input power is given by $$P_{max}=V_{max}^2 R$$

and the average power of repetitive high voltage pulses with frequency f and length Δt is $$P_{pulse}=V_{pulse}^2 R \Delta t f$$

The maximum frequency is obtained when $P_{max}=P_{pulse}$, which gives $$f_{max}=V_{max}^2/(V_{pulse}^2 \Delta t)$$

Values from the best Q-switching component Δt=30 ns and $V_{pulse}$=1 kV, leads to an estimated frequency limit before melting of $f_{max}$=7.5 kHz. This is in the range of what one would expect from a Q-switched laser and can probably be improved by cooling. The component has been placed in liquid nitrogen to investigate if the expansion would disappear due to the contracted conductor, but the experiment showed the same fast polarization changes.

The full theory of Q-switching is beyond this disclosure but we will experimentally verify that the developed concept works as predicted. The used laser setup is not optimized for Q-switching because of the struggle to shorten the cavity and maintain enough gain with used gain media. The preferred fiber for short gain media is phosphate fiber where an article shows [laser] high performance lasers with 2 cm Yb/Er-doped fiber. The melting point for available phosphate glass fiber is far lower than fused silica and difficult to fusion splice. Total melting occurred already during pre-fusion using a 180 um Er:Yb phosphate fiber produced by Kigre. Therefore our gain media is based on standard Erbium doped silica glass fiber.

Figure 27:
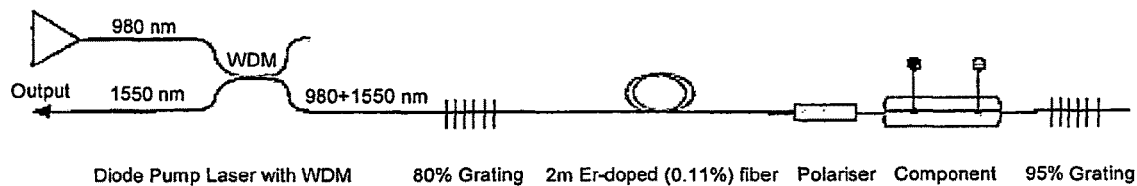
FIG. 27 shows a diode-pumped, Q-switched laser with a polarization switch component according to the present invention. The total cavity length is 10 m.
Figure 28:
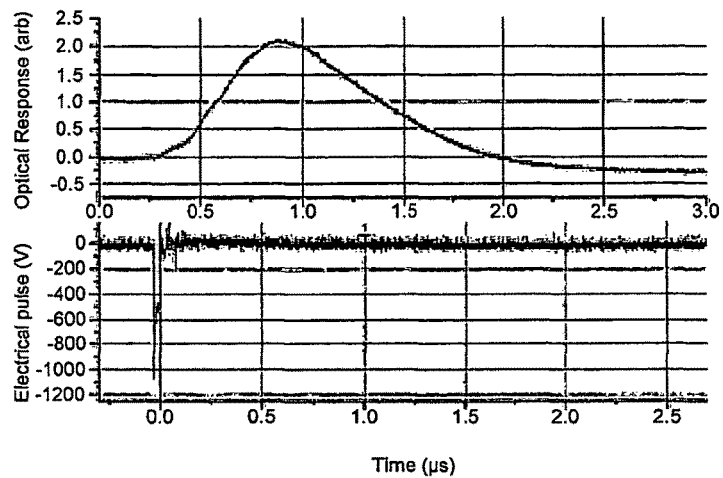
FIG. 28 shows a 1 μs pulse generated from the Q-switched laser using a polarization control according to the present invention.

The 1550 nm laser cavity is shown in FIG. 27. The high power (up to 580 mW) 980 nm single mode diode laser is coupled into the cavity through a WDM (Wavelength Division Multiplexing) that also secures the diode laser from 1550 nm pulses. The first grating is used as an out coupler because of the lower reflectance and wide band ($\Delta\lambda=1$ nm) and the complementary grating has higher reflectance and narrow band ($\Delta\lambda=0.2$ nm) to avoid several lasing peaks. To shorten the round trip time no manual polarization controllers was used in the cavity. The round trip time was calculated to 100 ns.

The outcome of the experiment is not extra ordinary but it clearly shows that the developed component is suitable for Q-switching. The 1 µs pulse was easily obtained after adjusting the polarization by bending the fibers. The length and gain of the cavity is the limiting factor of the Q-switching performance.

CONCLUSION

It was observed that when polarization controller elements were driven with nanoseconds high voltage pulses the polarization state of light in a fiber could be switched. The fastest polarization switch rise time measured was 10 ns long and shown in FIG. 25, this could probably be improved by decreasing the 4 ns high voltage pulse rise time. Two different mechanical processes was observed, one related to the length of the electrical pulse and one of oscillating nature, see FIG. 17, 15. The latter is strongly dependent on the presence of acrylic fiber coating which indicates on that the oscillations arise from acoustic resonance. The measured period time matches well with calculated values of acoustic resonance of fused silica fiber with 125 µm diameter. Experiments found in literature also strengthen this theory [5]. Both these components is due to mechanical processes since calculations and experiments shows that the heat gradient, that also can affect the polarization state, reached the core after microseconds.

The main disadvantage of Q-switching with a polarization switch is that the performance of the laser is highly sensitive to surrounding temperature. A temperature change of the surroundings changes the cavity polarization and must be compensated with internal polarization controllers to maintain Q-switching. This may be solved with a very short cavity length or by using polarization maintaining fibers. Alternatively, the polarization dependence of temperature may be compensated for by adding to the high voltage/current pulse of short duration a DC component. Such DC component can then be adjusted to compensate for temperature drift due to the environmental fluctuations and for when the repetition rate is changed and the device develops a variable amount of average heat.

There are many ways of using the technique of internal electrodes for Q-switching but one of the most promising is to combine a narrow Bragg grating and the internal electrode into the same component. When applying high voltage to the internal conductor the pressure will change the reflection center wavelength (or more generally, the Bragg wavelength) very rapidly, and if the corresponding grating is correctly chosen, the cavity will be switched on and off. For example, a suitable Bragg grating may be a DFB (Distributed Feed-Back) grating having a narrow transmission peak. For a Q-switched fiber laser based on the inventive concept of temporarily changing the refractive index of the fiber, the attainable repetition frequency of Q-switched pulses is limited by the cooling-down time for the electrode in the fiber. Typical cooling times are in the order of milliseconds. As will be understood, for a cooling time of 1 ms, a repetition frequency of 1 kHz can be obtained. The cooling time is relatively faster when the device is operated at elevated temperatures, say at 60° C. rather than 20° C. (in an ambient temperature of about 20° C., cooling from 70→60° C. is faster than cooling from 30→20° C.). Conveniently, operation at an elevated temperature above room temperature can be achieved by adding a DC component to the electric pulses. As mentioned above, one example of a fiber laser Q-switched according to the principles disclosed herein is shown in FIG. 27.

APPENDIX

High Voltage Pulse Generator

Figure 29:
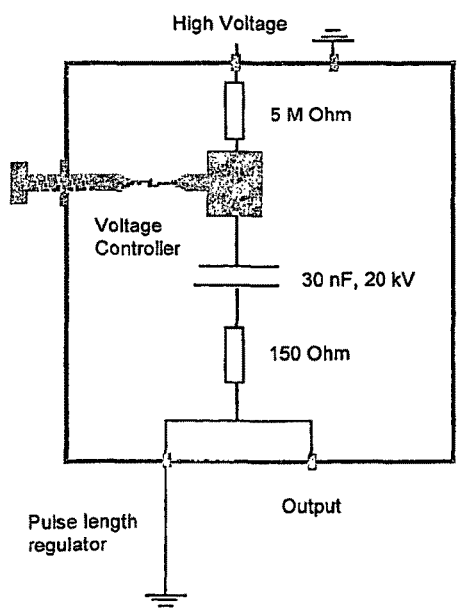
FIG. 29 shows schematically the high voltage pulse generator used to launch kV pulses with a rise time of 4 ns.

The schematic setup of the high voltage pulse generator is shown in FIG. 29. The pulse voltage is controlled by adjusting the spark gap to increase or decrease the breakdown voltage of the gap. The pulse length is determined by the length of the short circuited coaxial cable, one meter coaxial cable result in 10 ns pulses. The frequency is determined by the 5 MΩ resistance, capacitance value and the applied high voltage, increased voltage result in higher frequency. Around 10 kV was applied to create a 1.5 kV pulse with 4 nanoseconds rise time and 50 Hz frequency.

REFERENCES

1. Laude L. D. Cohesive Properties of Semiconductors Under Laser radiation. (NATO ASI Series Martinus Nijhof Vol 69, The Hauge, 1983)
2. Rousse A, Rischel C, Fourmaux S, Uschmann I, Sebban S, Grillon G, Balcou P, Forster E, Geindre J P, Audebert P, Gauthier J C, Hulin D. Non Thermal Melting of Semiconductors Measured at Femtoseconds Resolution (Nature Vol 410, 2001)
3. Seymore E. Elastic Constants and Wave Propagation in Antimony and Bismuth (Physical Review, Vol 138, 1965)
4. San-Guo Shen. Calculation of the Elastic Properties of Semiconductors (J. Phys. Condens Matter 6, 1994)
5. A Gusarov, N H Ky, H G Limberger, R P Salathe, G R Fox. High-Performance Optical Phase Modulation Using Piezoelectric ZnO-Coated Standard Telecommunication Fiber (Journal of Lightwave technology, Vol 14, No 12, 1996)
6. N. F Borrelli and R. A. Miller, Determination of the Individual Strain-Optic Coefficients of Glass by an Ultrasonic Technique (Applied Optics, Vol 7 No. 5, 1968)
7. B. A. Auld, Acoustic Fields and Waves in Solids (Vol 1, 1973)
8. H. F Pollard, Sound Waves in Solids (Pion Limited, 1977)
9. Y Kaneda, Y Hu, C Spiegelberg, J Geng, S Jiang. Single Frequency All-fiber Q-switched laser at 1550 nm (Presented at OSA Topical Meeting on Advanced Solid-State Photonics 2004, Post deadline paper PD5: February 2004)

The invention claimed is:

1. A method of temporarily changing refractive index of an optical fiber containing a longitudinal electrode arranged in the cladding of said fiber along and parallel to the core of the fiber, characterized in that the change in refractive index is performed by applying a high voltage pulse to said longitudinal electrode, said high voltage pulse having a magnitude of at least 100 volts and a duration sufficiently short to prevent melting of the electrode, such that the electrode thermally expands through ohmic heating without melting and exerts a pressure on the fiber core to induce said temporary change of the refractive index.

2. The method of claim 1, wherein the high voltage pulse has a duration of less than 100 nanoseconds.

3. The method of claim 1, wherein the high voltage pulse has a magnitude of at least 500 volts.

4. The method of claim 1, wherein the high voltage pulse has a magnitude of about 1 kilovolt and a duration of about 30 nanoseconds.

5. The method of claim 1, wherein the high voltage pulse has a rise time from zero to maximum of less than 10 nanoseconds.

6. The method of claim 1, wherein the electrode has an electrical resistance of about 10-100 Ohms.

7. The method of claim 1, wherein the electrode is asymmetrically arranged in the fiber, such that birefringence is induced when the high voltage pulse is applied to the electrode.

8. A method of Q-switching a fiber laser, wherein the Q-switching is effected by means of a temporary change of refractive index according to claim 1.

9. A method of temporarily changing the Bragg wavelength of a Bragg grating, wherein the change of Bragg wavelength is effected by way of a temporary change of refractive index according to claim 1.

* * * * *